US012795518B2

(12) United States Patent
Carney Landow

(10) Patent No.: US 12,795,518 B2
(45) Date of Patent: Nov. 10, 2026

(54) COMPUTING LOCATION INFORMATION BASED ON ENGAGEMENT WITH RADIO FREQUENCY (RF) SOURCES

(71) Applicant: Boost SubscriberCo. L.L.C., Englewood, CO (US)

(72) Inventor: Kate Megan Carney Landow, Denver, CO (US)

(73) Assignee: Boost SubscriberCo. L.L.C., Englewood, CO (US)

( * ) Notice: Subject to any disclaimer, the term of this patent is extended or adjusted under 35 U.S.C. 154(b) by 869 days.

(21) Appl. No.: 17/746,440

(22) Filed: May 17, 2022

(65) Prior Publication Data

US 2023/0379803 A1 Nov. 23, 2023

(51) Int. Cl.
*H04W 48/16* (2009.01)
*H04W 8/00* (2009.01)
*H04W 64/00* (2009.01)

(52) U.S. Cl.
CPC ........... *H04W 48/16* (2013.01); *H04W 8/005* (2013.01); *H04W 64/00* (2013.01)

(58) Field of Classification Search
CPC ...... H04W 48/16; H04W 8/005; H04W 64/00
USPC .......................................................... 455/434
See application file for complete search history.

(56) References Cited

U.S. PATENT DOCUMENTS 10,511,950 B2 12/2019 Maier et al.
2020/0351623 A1* 11/2020 Eisner ..................... H04W 4/80

OTHER PUBLICATIONS wikipedia.com [online], "Radiolocation," Dec. 15, 2005, retrieved on Dec. 20, 2022, retrieved from URL<https://en.wikipedia.org/wiki/Radiolocation#:~:text=Radiolocation%2C%20also%20known%20as%20radiolocating,mains%2C%20and%20other%20public%20utilities.>, 9 pages.
Christ et al., "Radio frequency-based personnel location systems," Proceedings IEEE 34th Annual 2000 International Carnahan Conference on Security Technology (Cat. No.00CH37083), Oct. 2000, pp. 141-150.
Youssef et al., "Computing location from ambient FM radio signals," Presented at IEEE Wireless Communications and Networking Conference, New Orleans, LA, USA, Mar. 13-17, 2005, 8 pages.

* cited by examiner

*Primary Examiner* — Chuck Huynh
(74) *Attorney, Agent, or Firm* — Lowenstein Sandler LLP

(57) ABSTRACT

This disclosure relates to computing location information. In some aspects, a method includes receiving first information pertaining to a phone call from a wireless device to a destination entity, the first information comprising identification of a radio access network (RAN) tower to which the wireless device is connected; determining, based on the first information, a first location area for the wireless device within a coverage area of the RAN tower; receiving identifiers of one or more radio frequency (RF) sources whose radio signals are detected by the wireless device; accessing a database to obtain second information including a plurality of RF source identifiers and a location area corresponding to each RF source identifier; determining, based on the second information, a second location area for the wireless device within the first location area; and transmitting information indicative of the second location area to a computing device of the destination entity.

20 Claims, 5 Drawing Sheets

COMPUTING LOCATION INFORMATION BASED ON ENGAGEMENT WITH RADIO FREQUENCY (RF) SOURCES

TECHNICAL FIELD

This specification generally relates to wireless communication.

BACKGROUND

Cellular networks can be leveraged to determine the location of a caller using techniques such as triangulation. However, in some cases, the accuracy of such location determination may not be sufficient for the purposes of emergency calls (e.g., 911 calls in the United States). Obtaining supplemental location information from other sources can be computationally burdensome.

SUMMARY

In one aspect, this document describes a method for computing location information. The method includes receiving, at one or more computing devices, first information pertaining to a phone call from a wireless device to a destination entity, the first information including identification of a radio access network (RAN) tower to which the wireless device is connected for routing of the phone call; determining, by the one or more computing devices based on the first information, a first location area for the wireless device within a coverage area of the RAN tower; receiving, at the one or more computing devices, identifiers of one or more radio frequency (RF) sources whose radio signals are detected by the wireless device while being in the first location area; accessing, by the one or more computing devices, a database to obtain second information including a plurality of RF source identifiers and a location area corresponding to each of the plurality of RF source identifiers; determining, by the one or more computing devices based on the second information, a second location area for the wireless device that is within the first location area; and transmitting, by the one or more computing devices, information indicative of the second location area to a computing device of the destination entity.

Other embodiments of this aspect include corresponding computer systems, apparatus, computer program products, and computer programs recorded on one or more computer storage devices, each configured to perform the actions of the method. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations, the method can include sending a request to the wireless device requesting the identifiers of the one or more RF sources.

In some implementations, the one or more RF sources can include WIFI RF sources or RF sources using Institute of Electrical and Electronics Engineers (IEEE) 802.15 standards, such as Bluetooth® RF sources.

In some implementations, the database can include, for each of the plurality of RF sources, i) the corresponding RF source identifier, ii) the corresponding location area, and iii) a signal strength of the RF source detected by the wireless device.

In some implementations, the method can include receiving, at the one or more computing devices, information indicative of a signal strength of the one or more RF sources; and determining, using the database, the second location area based on the signal strength of the one or more RF sources.

In some implementations, the phone call can be an emergency call to the destination entity that requires the location of the wireless device.

In some implementations, the database can be periodically updated.

Particular implementations of the subject matter described in this disclosure can be implemented so as to realize one or more of the following advantages.

Determination of location of a wireless device may be improved significantly by supplementing/substituting information from a cellular network with location data from one or more radio frequency (RF) sources that are detected by the wireless device. By creating a database linking location information with strengths of radio signals (e.g., a Wi-Fi® signal or Bluetooth® signal), pre-stored location information can be used to supplement/substitute location information from cellular networks. This in turn can potentially provide life-saving advantages by improving the location determination of a caller particularly for emergency calls (e.g., 911 calls in the US). In some implementations, the technology described herein can also reduce reliance on cost-intensive and/or processing-intensive location information gathered from external sources.

It is appreciated that methods and systems in accordance with the present disclosure can include any combination of the aspects and features described herein. That is, methods and systems in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

For certain types of calls initiated from a wireless device (e.g., emergency calls such as 911 calls in the United States), determining the location of the wireless device can be important, for example, to direct first responders to the location. Cellular networks can be leveraged to determine the location of a wireless device using processes such as triangulation. However, in some cases, location information determined by leveraging the cellular networks only can be inaccurate, particularly in the context of emergency calls. The technology described herein allows for determining a location of a wireless device by leveraging information about various radio frequency (RF) networks detected by the wireless device. Specifically, identifiers, signal strength, and/or other parameters of RF networks detected by a wireless device can be compared against a pre-stored database of coverage information of the RF networks, and the information can be used with or without the location information obtained from the cellular networks to determine a potentially more accurate location of the wireless device.

Figure 1:
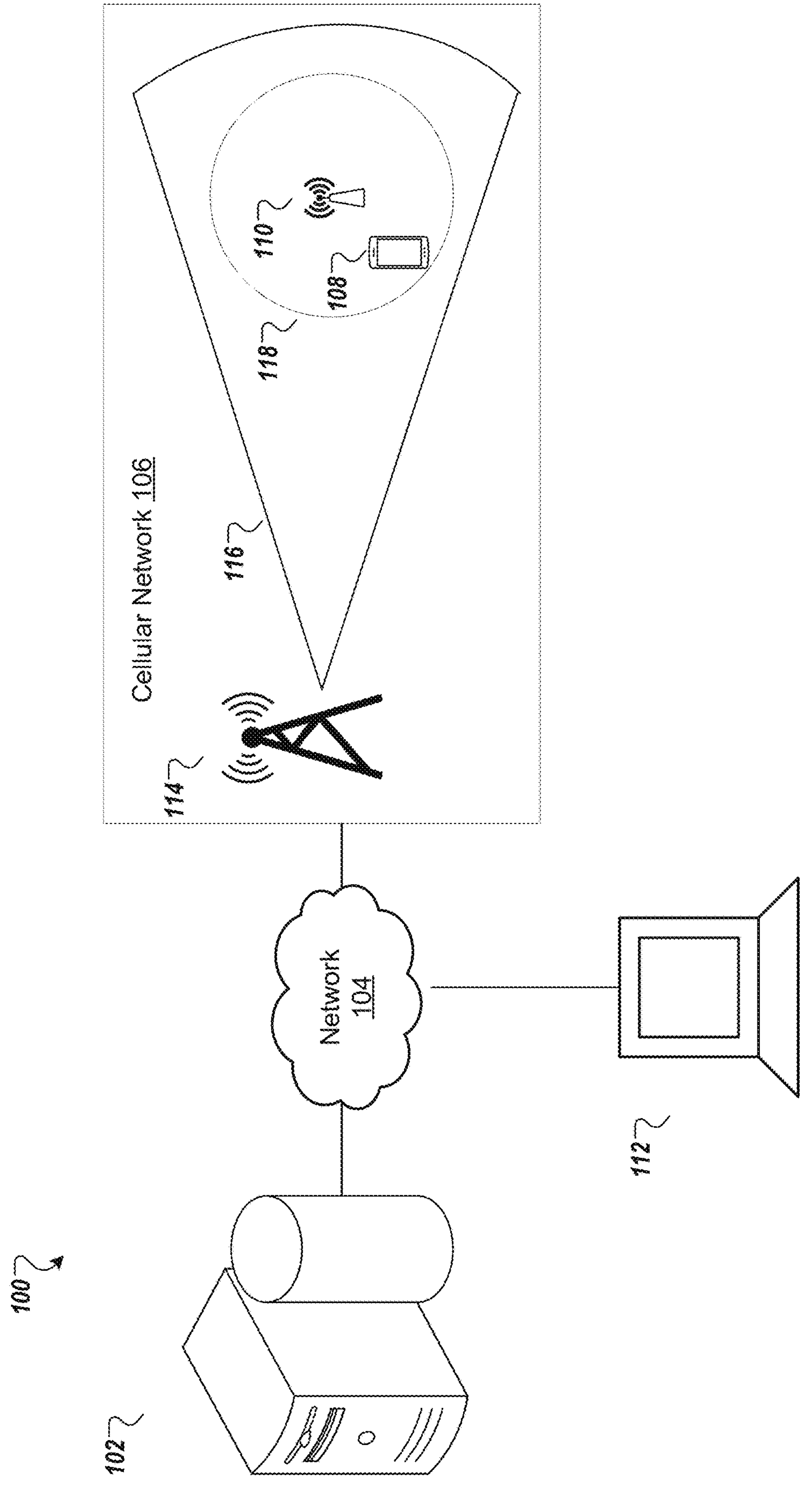
FIG. 1 is a block diagram of an example environment for computing location information.

FIG. 1 is a block diagram of an example environment 100 for computing location information in accordance with technology described herein. The example environment 100 includes a computing system 102 including one or more computing devices, a network 104, a cellular network 106, one or more wireless devices 108, one or more RF sources 110, and a destination device 112. The cellular network 106 can include a plurality of radio access network (RAN) towers 114.

The wireless device 108 can make a phone call to a destination device 112 of a destination entity by accessing the cellular network 106. For example, the wireless device 108 can make emergency calls (such as 911 calls in the United States) to a corresponding emergency response center. The destination device 112 can include one or more computing devices of the emergency response center. The wireless device 108 can be configured to access a RAN and be connected to a RAN tower 114 for routing of the phone call. The wireless device 108 can be configured to send call data pertaining to the phone call to the computing system 102 through the RAN tower 114.

In some implementations, the computing system 102 can be a service provider that provides the cellular network services. The computing system 102 can connect to the cellular network through a network, such as the Internet. In some examples, the cellular network can include a core network (not shown) that provides Internet connectivity for both data and voice services of the cellular network. In some examples, the data service and the voice service can be provided by the same carrier or by different carriers. The computing system 102 can be configured to receive information including the call data from the wireless device 108. The call data can include, for example, identification of the RAN tower to which the wireless device is connected for routing of the phone call.

The RAN towers 114 can each have a corresponding RAN tower identifier. Each RAN tower 114 covers a certain area, and the computing system 102 can be configured to maintain a database that includes the identification of each RAN tower 114 and the corresponding coverage area. In some implementations, each RAN tower 114 can include multiple sets of transceivers, each set of which covers a particular sector around the RAN tower 114. For example, a RAN tower can include three sets of transceiver equipment with each set covering a 120° sector around the tower. In such cases, each set of transceivers may have a unique identifier.

In some implementations, the computing system 102 can be configured to determine a location or location area for the wireless device 108 within the coverage area of the RAN tower 114 based on the received call data. For example, the computing system 102 can determine the coverage area of the RAN tower 114 based on the tower identifier included in the call data. Furthermore, the computing system 102 can determine a location area for the wireless device that is within the coverage area, based on the radio frequency the wireless device 108 is connected to. For example, the RAN tower 114 can have three sets of transceivers each corresponding to a subarea of the coverage area of the RAN tower. In some implementations, the computing system 102 can be configured to determine a location of the wireless device 108 based on, for example, information appended by the RAN tower 114 to data packets being routed through the RAN tower 114. For example, the computing system 102 can determine, based on information included in the packet headers generated/updated at the RAN tower 114, that the wireless device 108 is located in the subarea 116 that corresponds to a sector of the whole coverage area of the RAN tower 114.

The location of a wireless device 108 can be determined, for example, using information about the RAN tower (or a subset of the transceivers located on a RAN tower) that the device 108 is connected to. The technology described herein allows for potentially increasing the accuracy of location determination using information on RF networks within the coverage area of the RAN tower. For example, the computing system 102 can be configured to maintain a database of various RF sources and the corresponding coverage areas, and such information can be leveraged to fine tune the location of a wireless device 108, based on identifying that the wireless device 108 is within the coverage of a particular RF source. The RF sources 110 can be electronic devices that provide access to wireless services. For example, the RF sources 110 can be access points for Internet or Bluetooth® connections, or other connections. The RF sources 110 can include Wi-Fi® RF sources, RF sources using IEEE 802.15 standards, such as B0® RF sources, and the like. The RF sources 110 can be continuously sending out radio signals, so that wireless devices 108 within a certain distance of the RF sources 110 can detect the radio signals and potentially connect to the RF sources 110. The radio signals of each RF source 110 can include the identifier of the corresponding RF source 110. For example, an RF source 110 can periodically transmit beacon signals that include one or more identifiers of the RF source. Such beacon signals can in turn be used by a wireless device 108 to initiate a handshake to connect to the RF source 110. In some implementations, even if the wireless device does not connect to the RF source 110, the wireless device may extract the one or more identifiers of the RF source and pass on such identifiers to computing system 102.

The computing system 102 can maintain a database that includes a plurality of RF source identifiers and a location area corresponding to each of the plurality of RF source identifiers. In some implementations, the database can be stored in cloud storage. The computing system 102 can access the database from the cloud storage over the network 104. In some examples, the database for RF sources can be predetermined. For instance, the database can be created using one or more agent devices (not shown) that have previously detected the radio signals of the RF sources 110. An agent device can detect radio signals of an RF source at a certain location, and in turn provide the location data (e.g., as determined from a GPS module of the agent device) and potentially also the signal strength at the location. Such information can be used to derive the location areas covered by the RF source 110, which can in turn be used to determine the location of another wireless device. For example, if an agent device reports detecting the signals from a particular RF source at a certain signal strength, that information can be stored in the database. Later, when another wireless device detects signal from the same RF source and at a same/similar signal strength, a determination may be made that the wireless device is roughly at a similar distance from the RF source as reported earlier by the agent device. In some implementations, this determined information can then be used in conjunction with the location information derived from the connection of the wireless device with a particular RAN tower to determine the location of the wireless device with a high degree of accuracy.

In some implementations, the agent devices can be other wireless devices configured to collect information on signals detected from RF sources and report the same to the computing system 102. For example, the agent devices can be wireless devices deployed on vehicles that collect information on RF sources and provide the information to the computing system 102 as the vehicles traverse various locations. In some implementations, the agent devices can include consumer wireless devices that—upon compliance with appropriate regulatory and privacy practices and/or upon permission from the consumer—collect information on RF sources and provide the information to the computing system 102. For example, the agent devices can collect information on public Wi-Fi® hotspots. The public Wi-Fi® hotspots are used as examples. The agent devices can collect information on any other RF sources. In some implementations, the database can include the signal strength of each RF source at the location where the RF source signals are detected by the agent devices. In some implementations, the computing system 102 can maintain the database and periodically update the database.

The computing system 102 can use the database for RF sources to determine a more accurate location of the wireless device 108 within the subarea 116. In some implementations, the computing system 102 can be configured to request the wireless device 108 to provide the identifiers of the one or more RF sources 110 whose radio signals are detected by the wireless device 108. The computing system 102 can determine an RF-source-based location area for the wireless device 108 using the identifiers of the one or more RF sources 110. Using the identifiers of the one or more RF sources 110, the computing system 102 can access the database for RF sources and retrieve the location areas of the one or more RF sources 110 from the database. Because the wireless device 108 can detect the radio signals of the one or more RF sources 110, the computing system 102 can determine that the wireless device is located in proximity of the one or more RF sources 110, e.g., the distance from the wireless device 108 to each RF source 110 satisfies a distance threshold. The computing system 102 can use the location areas of the one or more RF sources 110 to determine the location of the wireless device 108. In the example of FIG. 1, the computing system 102 can use the identifier of the RF source 110 to determine that the wireless device 108 is within the RF-source-based location area 118 within the subarea 116 of the RAN tower 114.

In some implementations, the computing system 102 can transmit information indicative of the RF-source-based location area 118 to the destination device 112. The destination device 112 can be configured to use the more accurate location area of the wireless device 108 to provide location-based services. For instance, the destination device 112 can be associated with an emergency response center (e.g., a 911 response center) that can direct first responders to an accurate location of the wireless device 108. This in turn can allow first responders to locate the wireless device 108 and therefore provide time-critical services more efficiently.

The computing system 102 can include one or more computing devices, such as a server. The various functional components of the computing system 102 may be installed on one or more computers as separate functional components or as different modules of a same functional component. For example, the various components of the computing system 102 can be implemented as computer programs installed on one or more computers in one or more locations that are coupled to each through a network. In cloud-based systems for example, these components can be implemented by individual computing nodes of a distributed computing system.

The wireless devices 108 may include personal computers, mobile communication devices, and other devices that can send and receive data. The network 104 can include a local area network ("LAN"), wide area network ("WAN"), the Internet, or a combination thereof.

In some examples, the agent device can obtain the location data using other location services or map services. For instance, an RF source can be a Wi-Fi® hotspot of a library. An agent device in proximity of the library hotspot (e.g., within a distance threshold from the library hotspot) can detect the Wi-Fi® signals and obtain the signal strength of the Wi-Fi® signals. The agent device can also obtain a GPS location of the agent device, for example using a GPS module of the agent device. In some implementations, the agent device can determine/obtain the direction of the incoming Wi-Fi® signals. In some implementations, the agent device can compute, based on its own location, the signal strength, and optionally the direction information, a location of the RF source corresponding to the location of the agent device. In some implementations, the location of the RF source may be calculated by the computing system 102 based on information received at the computing system 102 from one or more agent devices. After the location of the RF source is determined, a location area that is covered by the RF source can be determined. In some implementations, the location area is determined as a circular area with the RF source being located at the center.

The RF source information including the RF source ID, the signal strength, and the corresponding location area for the RF source can be saved into the database. In some implementations, the agent devices can obtain the RF source information for each of the plurality of RF sources, and send the information to the computing system which can save the RF source information into the database. As a result, the database can include the location area for each of the plurality of RF sources, and the signal strength information at various positions in the location area. The signal strength information can be stored based on collected data or computed using a theoretical model.

Figure 2:
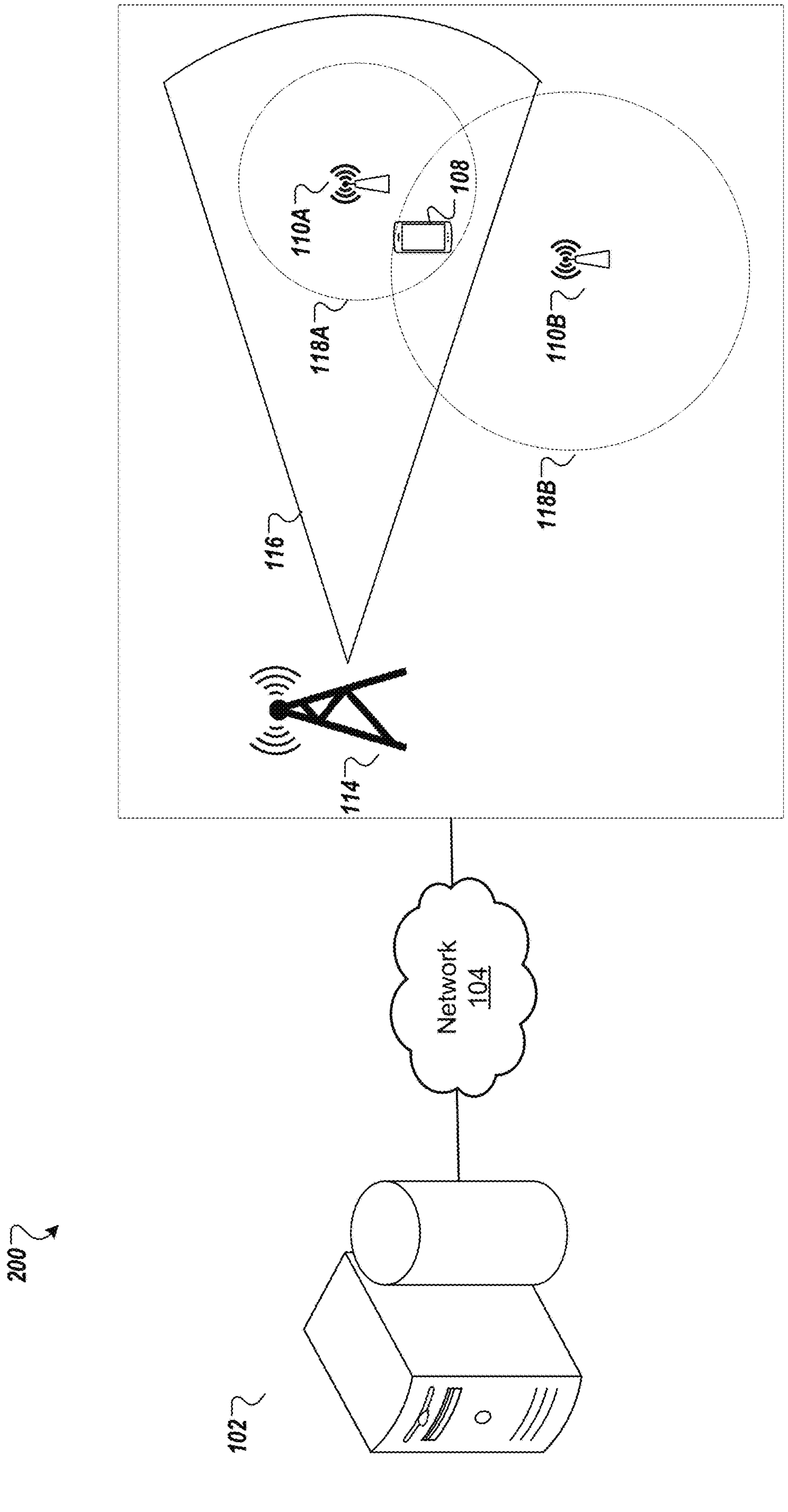
FIG. 2 is a block diagram of an example environment where radio signals from multiple RF sources are detected by a wireless device.

FIG. 2 is an example illustrating an environment 200 where radio signals from more than one RF source 110A and 110B (110, in general) are detected and used in computing a location of a wireless device 108. In some implementations, the wireless device 108 can detect the radio signals from both the RF source 110A and the RF source 110B. The wireless device 108 can be configured to provide the identifiers of the RF source 110A and RF source 110B to the computing system 102. The computing system 102 can be configured to use the location area of the RF source 110A and 110B to determine the RF-source-based location for the wireless device 108. For example, the RF source 110A can cover a location area 118A, and the RF source 110B can cover a location area 118B. Based on this information, the computing system 102 can determine that the wireless device 108 is at a location that is the intersection of location areas 118A and 118B. For example, the computing system can determine that the RF-source-based location for the wireless device 108 is the overlapping portion of the location areas 118A and 118B within the subarea 116 of the RAN tower 114. In some implementations, detected signals from two or more RF sources can be used in determining the location of the wireless device 108.

Figure 3:
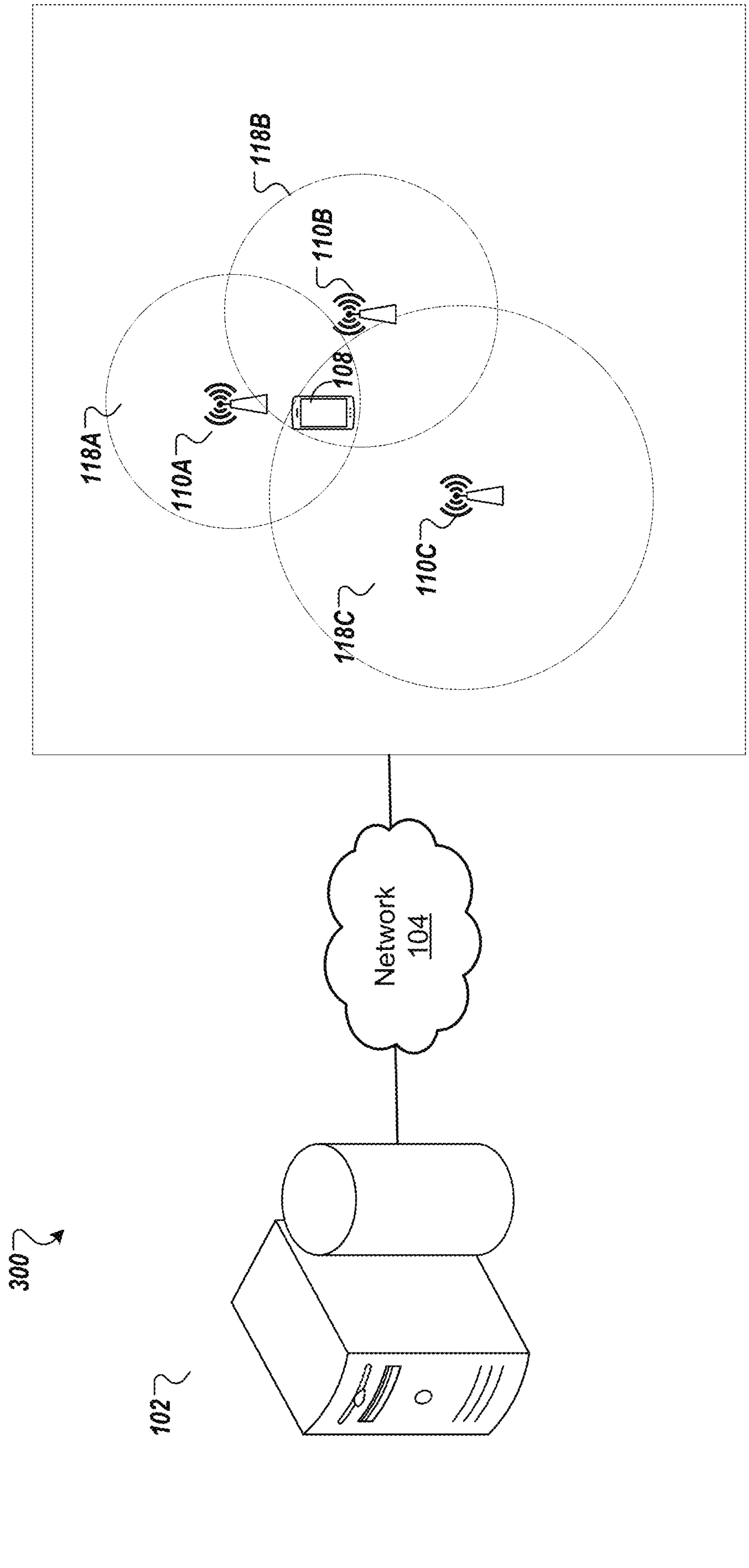
FIG. 3 is a block diagram of an example environment where location information pertaining to a wireless device can be computed without using information of a radio access network (RAN) tower.

FIG. 3 is an example illustrating an environment 300 for computing location information without using RAN tower information. In some implementations, the wireless device 108 can make a phone call without connecting to the RAN tower. For example, the wireless device can make a phone call over the Internet using a protocol such as Voice over IP (VOIP). The computing system 102 does not receive the RAN tower ID in such a case, and cannot determine the RAN tower-based location area. In some implementations, the computing system 102 can use the identifiers of the one or more RF sources whose radio signals are detected by the wireless device 108 to determine the RF-source-based location for the wireless device 108.

For example, the wireless device 108 can detect the radio signals from RF sources 110A-110C (110 in general). The wireless device 108 can provide the identifiers of the RF sources 110 to the computing system 102. The computing system 102 can be configured to use the location area of the RF sources 110 to determine the RF-source-based location for the wireless device 108. For example, the RF source 110A can cover a location area 118A, the RF source 110B can cover a location area 118B, and the RF source 110C can cover a location area 118C. In this example, the computing system 102 can determine that the wireless device 108 is at a location at the intersection of the location areas 118A-118C. As a result, even without the RAN tower information, the computing system 102 can still determine the location of the wireless device 108.

Figure 4:
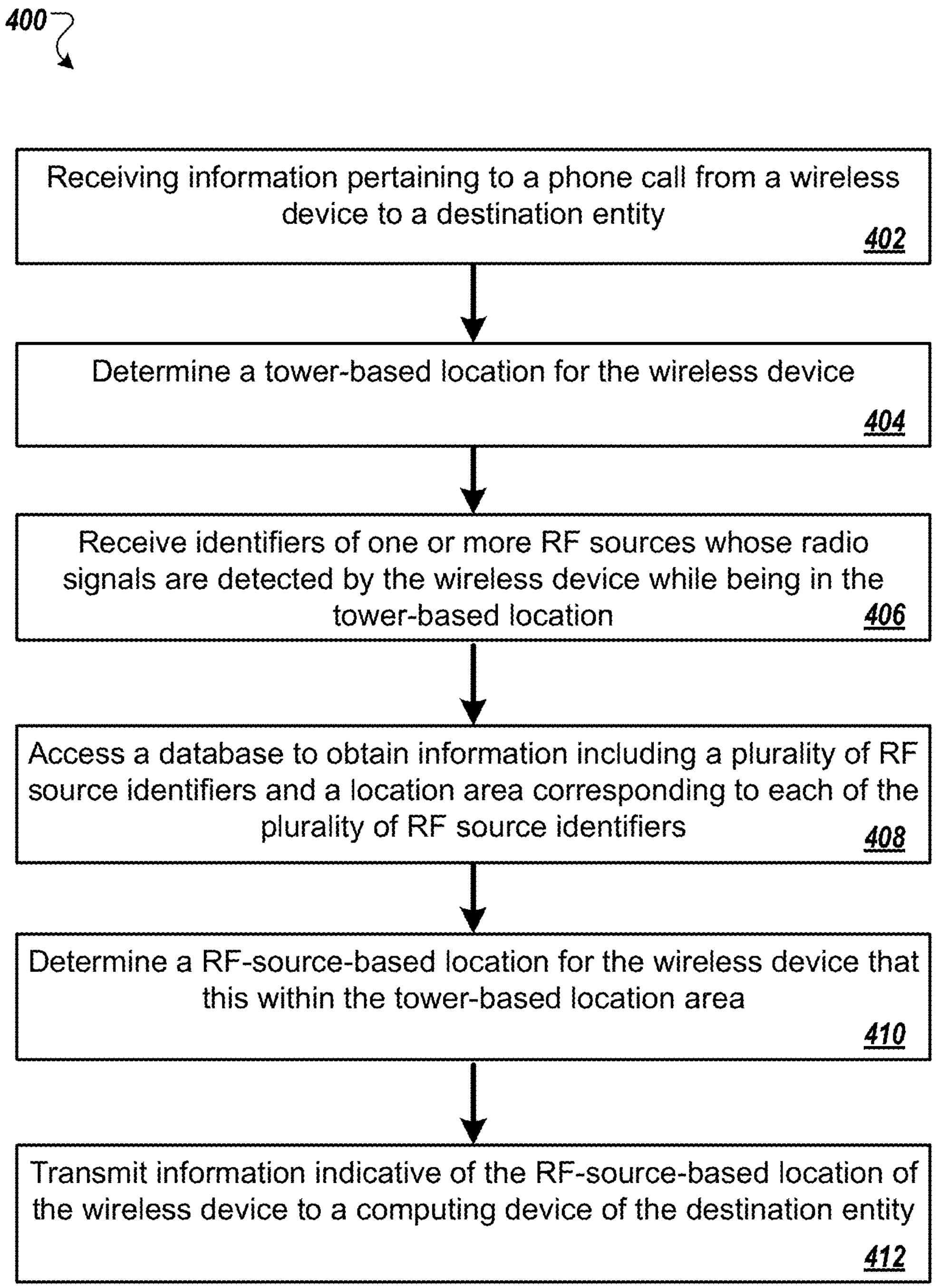
FIG. 4 is a flow diagram of an example process for computing location information pertaining to a wireless device.

FIG. 4 is a flow diagram of an example process 400 for computing location information. In some implementations, at least a portion of the process 400 can be executed at the computing system 102.

At step 402, the computing system can receive information pertaining to a phone call from a wireless device to a destination entity. The received information can be call data that include identification of a RAN tower to which the wireless device is connected for routing of the phone call. The wireless device can be a user device that makes a phone call to the destination entity. For example, the wireless device can make emergency calls (such as 911 calls in the United States) wherein location information of the wireless device can be useful to the first responders. The wireless device can access a RAN and be connected to a RAN tower for routing of the phone call. The wireless device can send call data of the phone call to the computing system through the RAN tower. The computing system can receive information including identification of the RAN tower to which the wireless device is connected for routing of the phone call.

At step 404, the computing system can determine a tower-based location for the wireless device that is within a coverage area of the RAN tower, using the received information. For example, the computing system can determine the coverage area of the RAN tower based on the tower identifier included in the call data. Furthermore, the computing system can determine a location area for the wireless device that is within the coverage area, based on the radio frequency the wireless device is connected to. For example, the RAN tower can have three radio frequencies that are corresponding to three subareas of the coverage area of the RAN tower. Based on the radio frequency of the RAN that the wireless device is connected to, the computing system can determine in which subarea of the coverage area the wireless device is located. For example, the computing system can determine a tower-based location for the wireless device that is within a coverage area of the RAN tower, e.g., a sector of the whole coverage area of the RAN tower.

At step 406, the computing system can receive identifiers of one or more RF sources whose radio signals are detected by the wireless device while being in the tower-based location. When the wireless device is making the phone call in a first location area, e.g., a tower-based location area, that is covered by the RAN tower, the wireless device can detect radio signals of one or more RF sources. After receiving the call data of the phone call, the computing system can send a request to the wireless device requesting identifiers of the one or more RF sources whose radio signals are detected by the wireless device while being in the location area covered by the RAN tower. The computing system can receive the identifiers of the one or more RF sources from the wireless device. In some implementations, the computing system can communicate with the wireless device through a back channel.

At step 408, the computing system can access a database to obtain information including a plurality of RF source identifiers and a location area corresponding to each of the plurality of RF source identifiers.

At step 410, the computing system can determine a RF-source-based location for the wireless device that is within the tower-based location area, based on the obtained information from the database. The computing system can determine an RF-source-based location area for the wireless device using the identifiers of the one or more RF sources. Using the identifiers of the one or more RF sources, the computing system can retrieve the location areas of the one or more RF sources from the database.

Because the wireless device can detect the radio signals of the one or more RF sources, the computing system can determine that the wireless device is located in proximity of the one or more RF sources, e.g., the distance from the wireless device to each RF source satisfies a distance threshold. The computing system can use the location areas of the one or more RF sources to determine the location of the wireless device. For example, the computing system can use the identifier of the RF source to determine the RF-source-based location area for the wireless device. The RF-source-based location area can be a smaller area that is within the tower-based location area. Thus, the computing system can provide a more accurate location of the wireless device by narrowing down the location area from the tower-based location area to the RF-source-based location area.

At step 412, the computing system can transmit information indicative of the RF-source-based location of the wireless device to a computing device of the destination entity. The computing system can transmit information indicative of the RF-source-based location area to a computing device of the destination entity, e.g., the destination device. The destination device can use the more accurate location area of the wireless device to provide location-based services. For instance, the phone call can be an emergency call, such as 911 in the United States. The 911 center can locate the caller more accurately, and provide location-based services to the caller which can be life-saving.

The order of steps in the process 400 described above is illustrative only, and the process 400 can be performed in different orders. In some implementations, the process 400 can include additional steps, fewer steps, or some of the steps can be divided into multiple steps.

In some implementations, the wireless device can detect radio signals from more than one RF source. The wireless device can obtain information indicative of the signal strength for each RF source. The computing system can receive such information, and determine the RF-source-based location area based on the signal strength of each RF source. For example, if the wireless device detects that the radio signals from RF source A are stronger than the radio signals from RF source B, the computing system can determine that the wireless device is located closer to RF source A. As a result, the computing system can determine the RF-source-based location for the wireless device more accurately.

Figure 5:
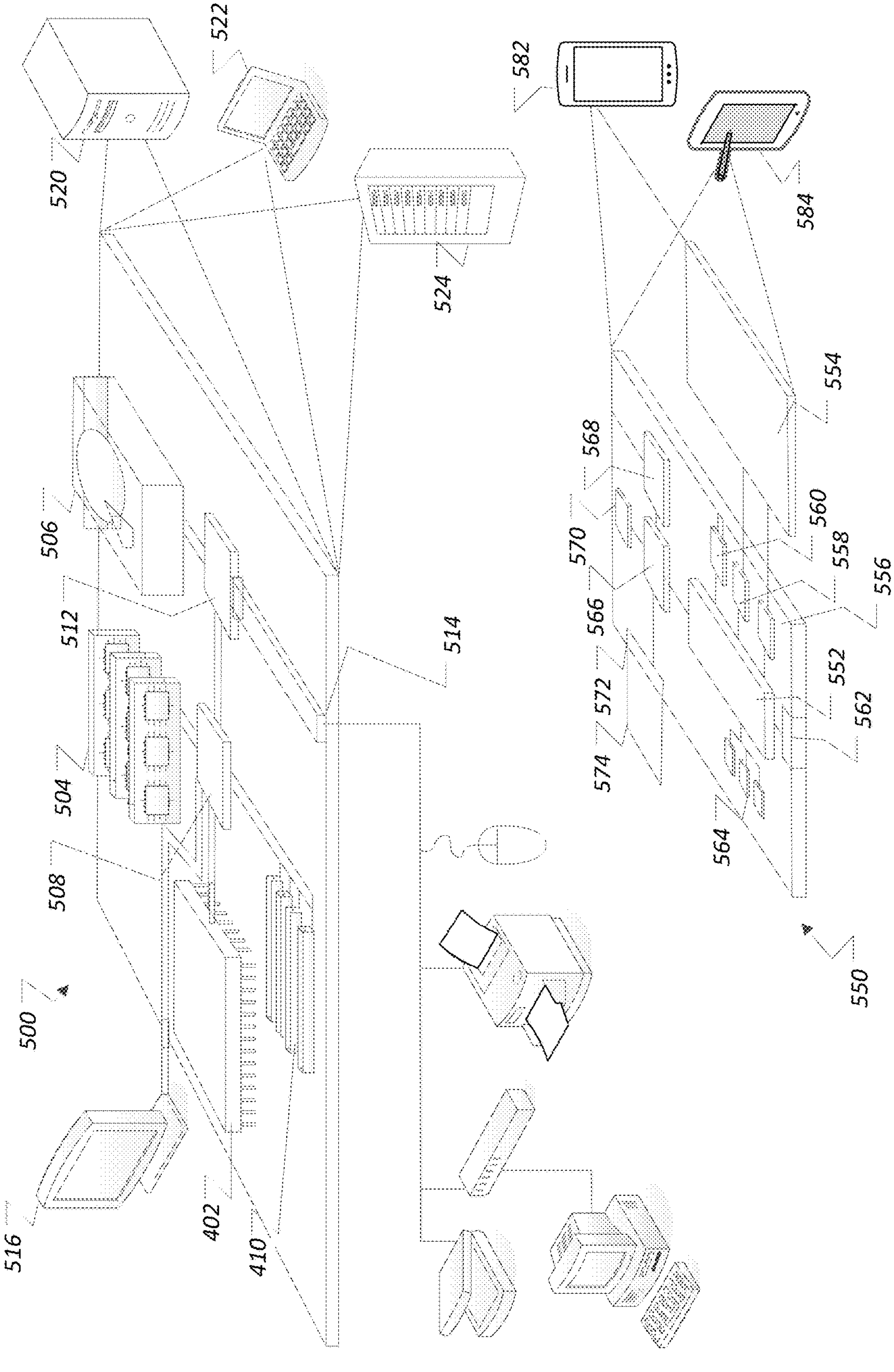
FIG. 5 illustrates block diagrams of example computing devices.

FIG. 5 shows an example of a computing device 500 and a mobile computing device 550 (also referred to herein as a wireless device) that are employed to execute implementations of the present disclosure. The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smartphones, AR devices, and other similar computing devices. The components shown here, their connections and relationships, and their functions, are meant to be examples only, and are not meant to be limiting. The computing device 500 and/or the mobile computing device 550 can form at least a portion of the computing system 102, the wireless device 108, the agent device, and the destination device 112 described above.

The computing device 500 includes a processor 502, a memory 504, a storage device 506, a high-speed interface 508, and a low-speed interface 512. In some implementations, the high-speed interface 508 connects to the memory 504 and multiple high-speed expansion ports 510. In some implementations, the low-speed interface 512 connects to a low-speed expansion port 514 and the storage device 506. Each of the processor 502, the memory 504, the storage device 506, the high-speed interface 508, the high-speed expansion ports 510, and the low-speed interface 512, are interconnected using various buses, and may be mounted on a common motherboard or in other manners as appropriate. The processor 502 can process instructions for execution within the computing device 500, including instructions stored in the memory 504 and/or on the storage device 506 to display graphical information for a graphical user interface (GUI) on an external input/output device, such as a display 516 coupled to the high-speed interface 508. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of a computer-readable medium, such as a magnetic or optical disk.

The storage device 506 is capable of providing mass storage for the computing device 500. In some implementations, the storage device 506 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 502, perform one or more methods, such as those described above. The instructions can also be stored by one or more storage devices, such as computer-readable or machine-readable mediums, such as the memory 504, the storage device 506, or memory on the processor 502.

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards. In this implementation, the low-speed interface 512 is coupled to the storage device 506 and the low-speed expansion port 514. The low-speed expansion port 514, which may include various communication ports (e.g., Universal Serial Bus (USB), Bluetooth®, Ethernet, wireless Ethernet) may be coupled to one or more input/output devices. Such input/output devices may include a scanner, a printing device, or a keyboard or mouse. The input/output devices may also be coupled to the low-speed expansion port 514 through a network adapter. Such network input/output devices may include, for example, a switch or router.

The computing device 500 may be implemented in a number of different forms, as shown in the FIG. 5. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device, such as a mobile computing device 550. Each of such devices may contain one or more of the computing device 500 and the mobile computing device 550, and an entire system may be made up of multiple computing devices communicating with each other.

The mobile computing device 550 includes a processor 552; a memory 564; an input/output device, such as a display 554; a communication interface 566; and a transceiver 568; among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate. In some implementations, the mobile computing device 550 may include a camera device(s) (not shown).

The processor 552 can execute instructions within the mobile computing device 550, including instructions stored in the memory 564. The processor 552 may be implemented as a chipset of chips that include separate and multiple analog and digital processors. For example, the processor 552 may be a Complex Instruction Set Computers (CISC) processor, a Reduced Instruction Set Computer (RISC)

processor, or a Minimal Instruction Set Computer (MISC) processor. The processor 552 may provide, for example, for coordination of the other components of the mobile computing device 550, such as control of user interfaces (UIs), applications run by the mobile computing device 550, and/or wireless communication by the mobile computing device 550.

The processor 552 may communicate with a user through a control interface 558 and a display interface 556 coupled to the display 554. The display 554 may be, for example, a Thin-Film-Transistor Liquid Crystal Display (TFT) display, an Organic Light Emitting Diode (OLED) display, or other appropriate display technology. The display interface 556 may include appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a Single in Line Memory Module (SIMM) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provided as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as processor 552, perform one or more methods, such as those described above. The instructions can also be stored by one or more storage devices, such as one or more computer-readable or machine-readable mediums, such as the memory 564, the expansion memory 574, or memory on the processor 552. In some implementations, the instructions can be received in a propagated signal, such as, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as Global System for Mobile communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, and General Packet Radio Service (GPRS). Such communication may occur, for example, through the transceiver 568 using a radio frequency. In addition, short-range communication, such as using a Bluetooth or Wi-Fi, may occur. In addition, a Global Positioning System (GPS) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in FIG. 5. For example, it may be implemented in the device 108 described in FIG. 1. Other implementations may include a phone device 582 and a tablet device 584. The mobile computing device 550 may also be implemented as a component of a smart-phone, personal digital assistant, AR device, or other similar mobile device.

Computing device 500 and/or 550 can also include USB flash drives. The USB flash drives may store operating systems and other applications. The USB flash drives can include input/output components, such as a wireless transmitter or USB connector that may be inserted into a USB port of another computing device.

Although a few implementations have been described in detail above, other modifications may be made without departing from the scope of the inventive concepts described herein, and, accordingly, other implementations are within the scope of the following claims.

The invention claimed is:

1. A computer-implemented method comprising:

receiving, at one or more computing devices, first information pertaining to a communication from a wireless device to a destination entity, the first information comprising identification of a radio access network (RAN) tower to which the wireless device is connected for routing of the communication;

determining, by the one or more computing devices based on the first information, a first location area for the wireless device within a coverage area of the RAN tower;

receiving, at the one or more computing devices, identifiers of one or more radio frequency (RF) sources whose radio signals are detected by the wireless device while being in the first location area;

accessing, using the received identifiers of the one or more RF sources and by the one or more computing devices, a database maintained in memory and that includes a plurality of RF source identifiers and a location area corresponding to each of the plurality of RF source identifiers, wherein accessing the database comprises obtaining second information from the database;

determining, by the one or more computing devices based on the second information, a second location area for the wireless device that is within the first location area; and transmitting, by the one or more computing devices, information indicative of the second location area to a computing device of the destination entity, wherein the one or more RF sources comprise local wireless access points or short-range wireless devices that periodically transmit beacon signals including identifiers, the beacon signals being detected by the wireless device without requiring a connection to the one or more RF sources.

2. The computer-implemented method of claim 1, comprising:

after receiving the first information comprising the identification of the RAN tower, sending a request to the wireless device for the identifiers of the one or more RF sources.

3. The computer-implemented method of claim 2, wherein sending the request to the wireless device for the identifiers of the one or more RF sources comprises:

sending the request over a communication channel different than a communication channel used in receiving the first information comprising identification of the RAN tower to which the wireless device is connected for routing of the communication.

4. The computer-implemented method of claim 3, wherein receiving the first information comprising the identification of the RAN tower comprises:

receiving the first information over a communication channel that includes the RAN tower as an intermediary device, wherein sending the request over the different communication channel comprises:

sending the request over a back channel that does not include the RAN tower as an intermediary device.

5. The computer-implemented method of claim 1, wherein:

the database includes, for each of a plurality of RF sources, i) a corresponding RF source identifier, ii) a corresponding location area, and iii) a signal strength of the respective RF source.

6. The computer-implemented method of claim 1, comprising:

receiving, at the one or more computing devices, information indicative of a signal strength of the one or more RF sources; and determining, using the database, the second location area based on the signal strength of the one or more RF sources.

7. The computer-implemented method of claim 1, wherein the communication is a phone call to the destination entity that requires a location of the wireless device.

8. The computer-implemented method of claim 1, wherein the database is periodically updated.

9. The computer-implemented method of claim 1, comprising:

determining a location of the wireless device based on both (i) the first location area for the wireless device within the coverage area of the RAN tower and (ii) the second location area for the wireless device that is within the first location area; and generating the information indicative of the second location area using the determined location of the wireless device, wherein transmitting the information indicative of the second location area to the computing device of the destination entity comprises transmitting data indicating the determined location of the wireless device.

10. The computer-implemented method of claim 1, wherein accessing the database that includes the plurality of RF source identifiers and the location area corresponding to each of the plurality of RF source identifiers comprises:

accessing the database using the received identifiers of the one or more RF sources as database keys to obtain the second information from the database.

11. The computer-implemented method of claim 1, wherein receiving the identifiers of the one or more RF sources comprises:

receiving a first identifier of a first RF source and a second identifier of a second RF source, wherein obtaining the second information from the database comprises:

retrieving a first RF location area corresponding to the first RF source and a second RF location area corresponding to the second RF source, wherein determining the second location area for the wireless device comprises:

determining the second location area as an overlapping portion of the first RF location area corresponding to the first RF source and the second RF location area corresponding to the second RF source.

12. A non-transitory computer-readable medium encoded with instructions that, when executed by one or more computers, cause the one or more computers to perform operations comprising:

receiving first information pertaining to a communication from a wireless device to a destination entity, the first information comprising an identification of a radio access network (RAN) tower to which the wireless device is connected for routing of the communication;

determining, based on the first information, a first location area for the wireless device within a coverage area of the RAN tower;

receiving identifiers of one or more radio frequency (RF) sources whose radio signals are detected by the wireless device while being in the first location area;

accessing, using the received identifiers of the one or more RF sources, a database maintained in memory and that includes a plurality of RF source identifiers and a location area corresponding to each of the plurality of RF source identifiers, wherein accessing the database comprises obtaining second information from the database;

determining, based on the second information, a second location area for the wireless device that is within the first location area; and transmitting information indicative of the second location area to a computing device of the destination entity, wherein the one or more RF sources comprise local wireless access points or short-range wireless devices that periodically transmit beacon signals including identifiers, the beacon signals being detected by the wireless device without requiring a connection to the one or more RF sources.

13. The non-transitory computer-readable medium of claim 12, wherein the operations comprise:

after receiving the first information comprising the identification of the RAN tower, sending a request to the wireless device for the identifiers of the one or more RF sources.

14. The non-transitory computer-readable medium of claim 12, wherein:

the database includes, for each of a plurality of RF sources, i) a corresponding RF source identifier, ii) a corresponding location area, and iii) a signal strength of the respective RF source.

15. The non-transitory computer-readable medium of claim 12, wherein the operations comprise:

receiving information indicative of a signal strength of the one or more RF sources; and determining, using the database, the second location area based on the signal strength of the one or more RF sources.

16. The non-transitory computer-readable medium of claim 12, wherein the communication is a phone call to the destination entity that requires a location of the wireless device.

17. A system comprising one or more computers and one or more storage devices on which are stored instructions that are operable, when executed by the one or more computers, to cause the one or more computers to perform operations comprising:

receiving first information pertaining to a communication from a wireless device to a destination entity, the first information comprising identification of a radio access network (RAN) tower to which the wireless device is connected for routing of the communication;

determining, based on the first information, a first location area for the wireless device within a coverage area of the RAN tower;

receiving identifiers of one or more radio frequency (RF) sources whose radio signals are detected by the wireless device while being in the first location area;

accessing, using the received identifiers of the one or more RF sources, a database maintained in memory and that includes a plurality of RF source identifiers and a location area corresponding to each of the plurality of RF source identifiers, wherein accessing the database comprises obtaining second information from the database;

determining, based on the second information, a second location area for the wireless device that is within the first location area; and transmitting information indicative of the second location area to a computing device of the destination entity, wherein the one or more RF sources comprise local wireless access points or short-range wireless devices that periodically transmit beacon signals including identifiers, the beacon signals being detected by the wireless device without requiring a connection to the one or more RF sources.

18. The system of claim 17, wherein the operations comprise:

after receiving the first information comprising the identification of the RAN tower, sending a request to the wireless device for the identifiers of the one or more RF sources.

19. The system of claim 17, wherein:

the database includes, for each of a plurality of RF sources, i) a corresponding RF source identifier, ii) a corresponding location area, and iii) a signal strength of the respective RF source.

20. The system of claim 17, wherein the operations comprise:

receiving information indicative of a signal strength of the one or more RF sources; and determining, using the database, the second location area based on the signal strength of the one or more RF sources.

* * * * *